US007994474B2

(12) United States Patent
Hieke

(10) Patent No.: US 7,994,474 B2
(45) Date of Patent: Aug. 9, 2011

(54) LASER DESORPTION IONIZATION ION SOURCE WITH CHARGE INJECTION

(75) Inventor: Andreas Hieke, Cupertino, CA (US)

(73) Assignee: Andreas Hieke, Cupertino, CA (US)

( * ) Notice: Subject to any disclaimer, the term of this patent is extended or adjusted under 35 U.S.C. 154(b) by 188 days.

(21) Appl. No.: 11/800,458

(22) Filed: May 4, 2007

(65) Prior Publication Data

US 2008/0121798 A1 May 29, 2008

Related U.S. Application Data

(63) Continuation-in-part of application No. 11/063,485, filed on Feb. 22, 2005, now Pat. No. 7,138,642, application No. 11/800,458, which is a continuation-in-part of application No. 11/063,801, filed on Feb. 22, 2005, now abandoned.

(60) Provisional application No. 60/547,259, filed on Feb. 23, 2004, provisional application No. 60/547,302, filed on Feb. 23, 2004, provisional application No. 60/619,113, filed on Oct. 15, 2004, provisional application No. 60/798,377, filed on May 5, 2006.

(51) Int. Cl.
*H01J 49/00* (2006.01)
*B01D 59/44* (2006.01)

(52) U.S. Cl. .................... 250/288; 250/282; 250/423 R; 250/424; 313/231.31; 313/362.1; 315/111.81

(58) Field of Classification Search .................. 250/281, 250/282, 287, 288, 396 R, 400, 423 R, 424; 313/359.1, 362.1, 231.01, 231.31; 315/111.81, 315/111.91; 50/202
See application file for complete search history.

(56) References Cited

U.S. PATENT DOCUMENTS

| | | | | |
|---|---|---|---|---|
| 3,514,666 | A * | 5/1970 | Elmore | 315/111.91 |
| 4,135,093 | A * | 1/1979 | Kim | 250/423 R |
| 4,486,665 | A * | 12/1984 | Leung et al. | 250/427 |
| H235 | H * | 3/1987 | Kugel et al. | 376/143 |
| 4,650,631 | A * | 3/1987 | Knorr | 376/127 |
| 5,646,476 | A * | 7/1997 | Aston | 313/359.1 |
| 6,153,880 | A * | 11/2000 | Russ et al. | 250/292 |
| 6,335,535 | B1 * | 1/2002 | Miyake et al. | 250/492.21 |
| 7,084,396 | B2 * | 8/2006 | Schneider | 250/288 |
| 7,138,642 | B2 * | 11/2006 | Hieke | 250/400 |
| 7,365,341 | B2 * | 4/2008 | Saito et al. | 250/427 |
| 7,429,729 | B2 * | 9/2008 | Schultz et al. | 250/287 |
| 7,462,823 | B2 * | 12/2008 | Schneider | 250/288 |
| 2002/0063206 | A1 * | 5/2002 | Bateman et al. | 250/281 |
| 2002/0125421 | A1 * | 9/2002 | Yoshinari et al. | 250/281 |
| 2005/0001162 | A1 * | 1/2005 | Schneider | 250/288 |
| 2005/0194542 | A1 * | 9/2005 | Hieke | 250/400 |
| 2005/0194543 | A1 * | 9/2005 | Hieke | 250/400 |
| 2006/0219897 | A1 * | 10/2006 | Schneider | 250/288 |
| 2007/0075240 | A1 * | 4/2007 | Hieke | 250/282 |
| 2008/0078944 | A1 * | 4/2008 | Hieke | 250/400 |
| 2008/0121798 | A1 * | 5/2008 | Hieke | 250/288 |

* cited by examiner

*Primary Examiner* — Bernard E Souw
(74) *Attorney, Agent, or Firm* — Jones IP Group

(57) ABSTRACT

An innovative ion source is disclosed that in some embodiments provides an injected independent ion beam to increase the ionization efficiency of the ion source.

20 Claims, 10 Drawing Sheets

LASER DESORPTION IONIZATION ION SOURCE WITH CHARGE INJECTION

CROSS-REFERENCE TO RELATED APPLICATIONS

This application is a continuation-in-part of U.S. application Ser. No. 11/063,485, filed on Feb. 22, 2005 now U.S. Pat. No. 7,138,642 and published as U.S. 2005/0194542A1 on Sep. 8, 2005; that application claims the benefit of U.S. provisional patent application Ser. No. 60/547,259, filed Feb. 23, 2004. This application is also a continuation-in-part of U.S. application Ser. No. 11/063,801, filed on Feb. 22, 2005 now abandoned and published as US 2005/0194543A1 on Sep. 8, 2005; that application claims the benefit of U.S. Provisional Patent applications Ser. No. 60/547,302, filed Feb. 23, 2004, and Ser. No. 60/619,113, filed Oct. 15, 2004. This application further claims priority to U.S. Provisional Patent Applications Ser. No. 60/798,377, filed on May 5, 2006. All aforementioned applications are incorporated herein by reference in their entirety.

SUMMARY OF THE INVENTION

Embodiments of the present invention provide method of and devices for enhancing ion generation efficiency in an ion source by injecting an independent beam of relatively low molecular weight ions into a population of relatively larger molecular weight neutral sample molecules.

Certain embodiments of an inventive CIN-LDI/CIN-MALDI ion source system include a low energy charge injection ion beam (CIN-beam) of stable low molecular weight ions (including protons) originating from an ion gun, the ion beam being controlled and directed with specific kinetic energy by electric and/or magnetic fields into the plume of a laser pulse-desorbed sample containing sample ions and neutral sample molecules and/or onto the sample itself. Low energy collisions occur between neutrals and CIN-beam ions (CIN-ions) which attach to the neutral sample molecules thereby increasing the total sample ionization efficiency of the ion source and the sample ions then being extracted by electric fields. The system as a whole represents an optimized ion-optical and/or electro-pneumatic ion-optical configuration for high resolution mass spectrometry.

In some embodiments, the ion gun feeds ions into an ion trap to accumulate CIN-ions which are then pulsed into the LDI/MALDI region.

In some embodiments, the CIN-beam may be pulsed or modulated in a pulse-like arbitrarily time-dependent manner, synchronized with the laser and acceleration potentials on the electrodes in the CIN-LDI/CIN-MALDI ion source are turned off or floated during the CI ion injection but turned on thereafter to extract created sample ions.

In some embodiments, the initial kinetic energy of the CIN-ions is sufficient to reach the sample target with CIN-ion—sample interaction predominately occurring at the sample surface or its immediate proximity.

In some embodiments the initial kinetic energy of the CIN-ions is insufficient to reach the sample target causing them to generally reverse their trajectories thereby largely increasing the collision probability with neutrals, from that of certain other embodiments, thereby having most of the ionization of the neutral sample molecules occurring in a region adjacent to the sample.

In various embodiments, the CIN-beam is either DC or pulsed. In some of the pulsed embodiments, the pulsed CIN-beam may be synchronized to the MALDI laser(s) pulse(s). In some embodiments with several CIN-beam pulses, the pulses are synchronized to the MALDI laser(s) pulse(s)

Some embodiments of the inventive CIN-LDI/CIN-MALDI ion source system operate with pulsed or arbitrarily time-dependent electric potentials on the main electrodes of the ion source or attached or joint ion analytical instrument In some embodiments, the inventive CIN-LDI/CIN-MALDI ion source system operates at elevated pressures to achieve collisional sample ion cooling. In some cases, the collisional cooling is based on electro-pneumatic superposition. In some embodiments, the system operates with pulsed gas flow fields. In still other embodiments, the system operates with pulsed or arbitrarily time-dependent electric potentials on the main electrodes of the ion source or attached of joint ion analytical instrument In some embodiments of the inventive CIN-LDI/CIN-MALDI ion source system, the CIN-ion source is a separable and detachable component of the CIN-MALDI ion source. In other embodiments, the CIN-ion source is an integral part of the CIN-MALDI ion source.

In some embodiments of the inventive CIN-LDI/CIN-MALDI ion source system, the CIN-LDI/CIN-MALDI is attached to an ion analytical instrument. In other embodiments, it is attached to a MS (e.g. linear TOF, refectron TOF, quadrupole, ion trap [incl Orbitrap], Fourier transform ion cyclotron resonance MS, etc.), MS-MS (e.g. triple-quad TOF, TOF-TOF, trap-TOF etc.), or any other tandem mass spectrometer or MSn instrument or combination thereof. In still other embodiments, it is connected to a quadrupole or multi-pole with the CIN-beam being injected into the ion source on the axis of the quadrupole or multi-pole. In still other embodiments, it is connected to a tetrahedral ion trap (patent to be filed separately)

In some embodiments of inventive CIN-LDI/CIN-MALDI ion source system, the CIN-LDI/CIN-MALDI ion source is a separable device attached an ion analytical instrument. In the other embodiments, it is an integral part of an ion analytical instrument.

In some embodiments of the inventive CIN-LDI/CIN-MALDI ion source system, the CIN-beam and laser beam are simultaneously scanned over the sample and/or chip.

In some embodiments of the present invention a source of sample molecules other than an CIN-LDI/CIN-MALDI ion source may be used in conjunction with other aspects of embodiments of the present invention in order to generate or enhance the generation of ions of biological macromolecules or other sample molecules.

DETAILED DESCRIPTION OF THE INVENTION

Figure 1:
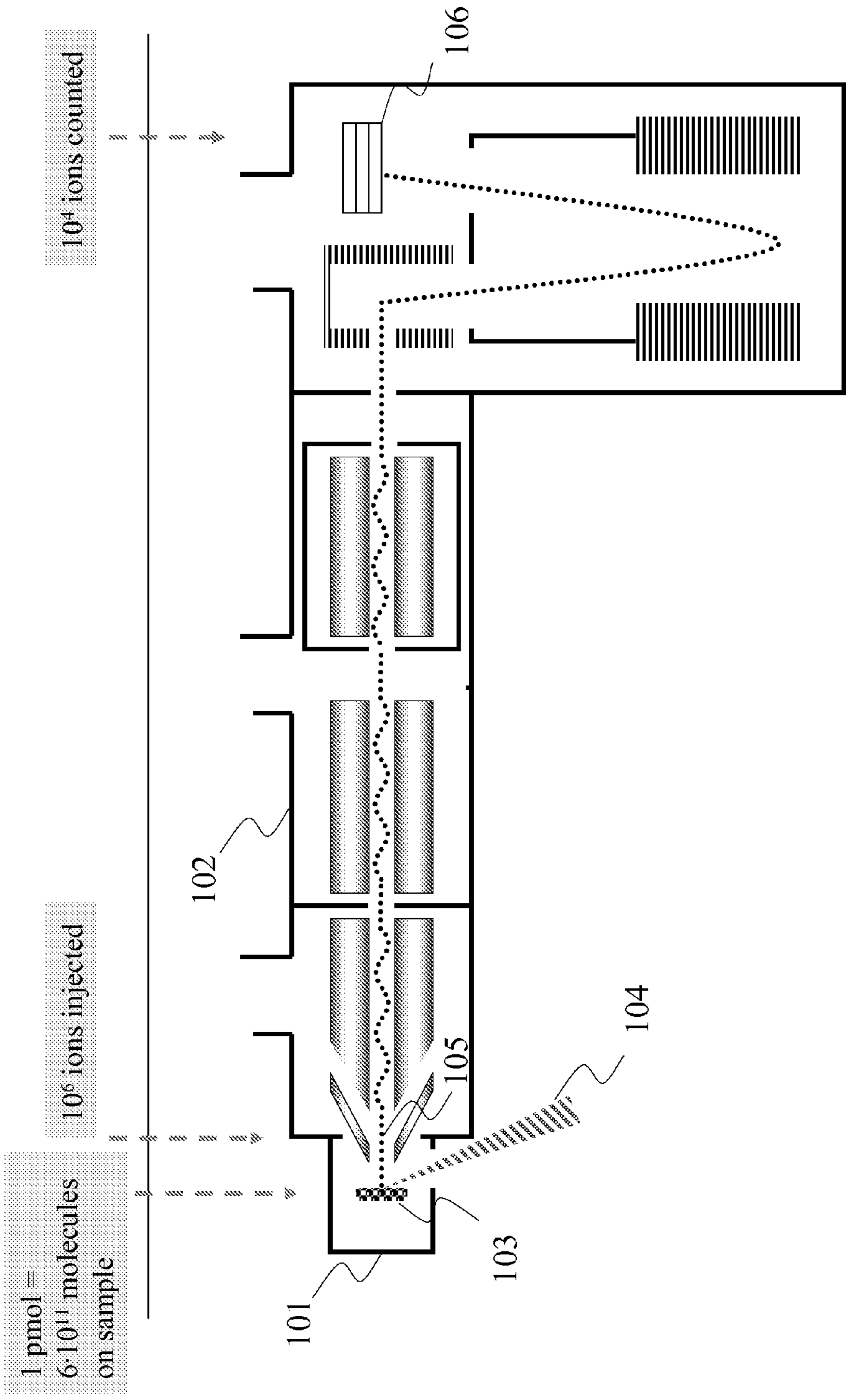
FIG. 1 is a simplified schematic overview of a typical ion budget in a conventional MALDI ion source connected to a triple-quad TOF mass spectrometer.

Aspects of the present invention address a variety of problems, including at least one particular problem associated with conventional MALDI. One particular problem of note is that the rate of ion generation is highly inefficient. In certain embodiments, the inventive “Charge-Injection” LDI/MALDI (CIN-LDI/CIN-MALDI) ion source technology described herein can achieves orders-of-magnitude higher sample ionization efficiency over conventional systems. In some embodiments it accomplishes this, at least in part, by exposing the ejected neutral sample molecules to a controlled and directed beam of low molecular weight ions originating from an ion beam gun. By way of understanding terminology and usage herein, “CIN” is an acronym referencing “charge injection”, and “CIN-ion gun”, “CIN-gun”, “CIN-ion source”, and “CIN-source” all refer to a device that generates, or serves as a source or supply of, low molecular weight ions. Such devices or sources, may, in some embodiments, be a type of duo-plasmatron, radio-frequency (RF), micro-wave, or Penning type ion guns. Embodiments of the present invention can approach or exceed yield improvements in data sensitivity of up to one or more orders of magnitude from minute amounts of biological macromolecules, with sample amounts as small as the deep sub-atto ($10^{-18}$) mole range or less. The described CIN-LDI/CIN-MALDI technology can also be used in conjunction with so called collisional (sample) ion cooling and electro-pneumatic superposition which can, in addition, reduce ion fragmentation, thereby addressing an additional problem of conventional MALDI, that of molecular fragmentation and decay.

In a typical application of the present invention, the CIN-LDI/CIN-MALDI ion source is used to create ions of biological macromolecules that are subsequently analyzed. In certain embodiments of the present invention the biological macromolecules to be analyzed may be of relatively larger molecular weight than the molecular weight of the ions of the CIN-beam. In some embodiments, the macromolecules may have molecular weights from $10^2$ to $10^6$ u while the molecular weight of the injected ions may be smaller than $10^2$ u.

Additionally, in some embodiments, the CIN-beam can serve to reduce the abundance of, neutralize or eliminate sample ions otherwise generated by effect of the collision of the undesired sample ions with those of the CIN-beam.

It should be noted that while reference is made herein to the interaction of injected ions with neutral sample molecules, it is pointed out that as aspects of the present invention, injected ions may also interact, including interact in the same embodiments, with already ionized sample molecules.

In the operation of a typical Maldi ion source, a UV laser (sometimes IR) is fired at the crystals in the MALDI spot with typical pulse duration on the order of $t_{LP} \approx 10^{-9}$ to $10^{-8}$ s. The matrix molecules in the spot absorb the electromagnetic laser energy and it is thought that primarily the matrix is ionized by this event. The matrix is then thought to transfer part of its charge to the analyte (e.g. a protein), thus ionizing the sample molecules while still protecting them from the disruptive energy of the laser. Neutrals and ionized sample molecules and fragments or clusters of either of the neutrals or ions are ejected as a result of the laser desorption. Ions observed after this process are typically ionized by the addition of a proton to [M+H]+ or the removal of a proton [M−H]−. Conventional MALDI generally produces singly-charged ions, but multiply-charged ions such as [M+2 H]2+ have been observed specifically in conjunction with IR lasers. However, a thorough analysis of the budget of ions in a mass spectrometer shows that the total ionization efficiency of conventional MALDI ion sources is very low.

FIG. 1 shows a simplified schematic overview of a typical ion budget in a current MALDI ion source 101 connected to a triple-quad TOF mass spectrometer (102). The sample 103 is exposed to pulses of laser radiation 104 which generate sample ions which 105 are introduced into the mass spectrometer (102). After (selectively) passing through the mass spectrometer 102, the ions 105 are eventually detected and manifested as electrical signals at the ion detector 106, and electronically counted by connected equipment.

If, for example, in a conventional device as illustrated in FIG. 1, a sample of 1 pmol ($6 \cdot 10^{23} \cdot 10^{-12} = 6 \cdot 10^{11}$) of stable biological macromolecules with a mass on the order of $m = 10^3$ u is introduced, an ion count on the order $10^4$ can be expected at the detector 106. It is known that the total ion transmission efficiency of, for example, a particular type of mass spectrometer (incl. detector efficiency, duty cycle, quadrupole transmission etc.) is on the order of $10^{-2}$. This means that approximately only $10^6$ ions 105 are transmitted from the MALDI ion source into the particular mass spectrometer.

Since the sample contains $6 \cdot 10^{11}$ molecules, the ionization efficiency is on the order of $10^6 / 6 \cdot 10^{11} \approx 1.6 \cdot 10^{-6}$. Thus, approximately only one sample molecule per million becomes an ion and is transmitted into the mass spectrometer. The ionization efficiency depends also on the total sample amount as well as many other more or less difficult to control parameters such as the matrix crystallization process, the matrix chemistry, laser operating parameters etc. However, even if this approximation would underestimate the ionization efficiency by one order of magnitude it is still apparent that a fundamental shortcoming of state-of-the-art MALDI is the lack of ionization efficiency. The creation and transfer of free charges to sample molecules in a conventional MALDI process can in fact be considered a byproduct.

Aspects of the present inventive CIN-LDI/CIN-MALDI system solve this problem, and accomplish other benefits, by exposing the ejected neutral sample molecules, in certain embodiments, to a controlled and directed low energy ion beam of stable, low molecular weight (CIN-beam) originating from an ion beam gun and causing a portion of the ions in the CIN-beam to collide with and attach to the neutral sample molecules, thereby substantially increasing the total ionization efficiency. The exposure to the CIN-beam can also effect a chemical reaction which predominantly leaves the sample molecules or products thereof in an ionized state.

As noted above, the ionization efficiency of conventional LDI/MALDI ion sources is very low. A factor underlying this inefficiency, as the applicant has inventively recognized, is the lack of sufficient free charges and insufficient time and probability to transfer existing charges to neutral sample molecules. In conventional MALDI ion sources, the available time for ionization is presumably approximately only on the order of the duration of the laser pulse or slightly above ($t \approx 10^1$ ns). Thereafter, the plume expands and the few free charges in form of electrons and protons are rapidly extracted from the plume due their substantially lower mass-to-charge ratio m/q compared to sample ions of interest, with a typical $m/q \approx 10^2$ u/e to $10^5$ u/e.

Experimental results have shown that the velocities with which ions and neutrals are ejected from MALDI targets are typically on the order of $ve=10^2$ m/s to $10^3$ m/s. (See e.g. Volker Bökelmann, Bernhard Spengler and Raimund Kaufmann: "Dynamical parameters of ion ejection and ion formation in matrix-assisted laser desorption/ionization", Eur. Mass Spectrom. 1, 1995, page 81-93). With typical dimensions of MALDI ion sources being on the order of $10^{-2}$ m, the applicant has determined that a time interval of at least $t=10^{-4}$ second to $10^{-5}$ for interaction in certain embodiments with the charge injection beam would be available. Therefore, the present inventive CIN-LDI/CIN-MALDI system hugely increases ionization efficiencies by providing a directed high density of free charges (injected CIN-ions) in a manner that provides a high collision and charge transfer probability between the CIN-ions and the desorbed sample neutrals.

Figure 2:
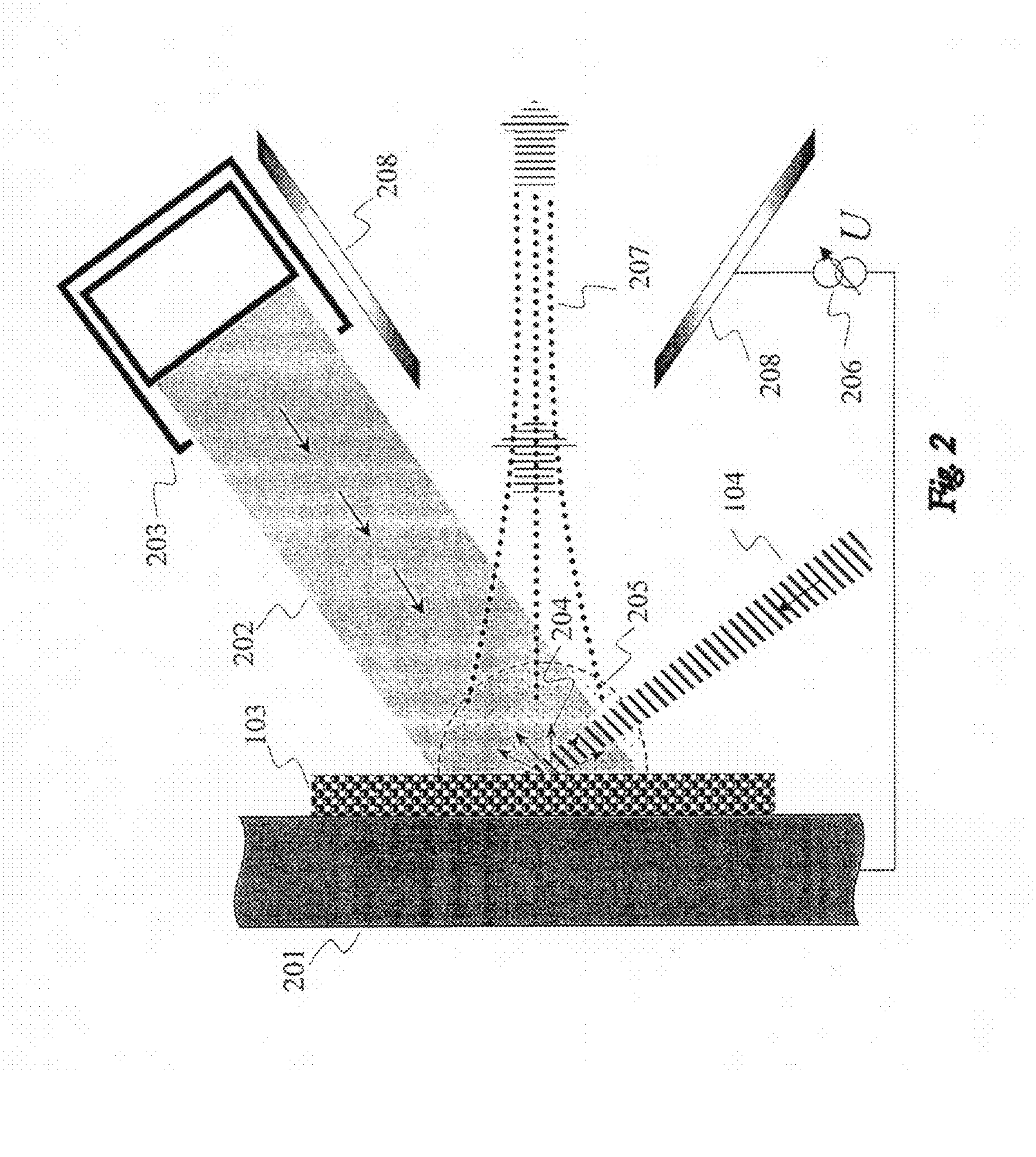
FIG. 2 depicts a design of an embodiment of an inventive CIN-LDI/CIN-MALDI ion source according to aspects of the present invention comprising a sample, CI ion beam gun, CI ion beam, and extraction electrodes.

As shown in FIG. 2 depicting an embodiment of the invention, a CIN-beam 202 of low molecular weight ions (such as H [protons], He, Li, O, Ne, Na, Ar, K, Xe, etc.) originates from a dedicated ion beam gun 203 (typically a duo-plasmatron, RF, Micro-Wave, or Penning type) which is either an integral part of the CIN-LDI/CIN-MALDI ion source or attached to it in a separable configuration. The ion source is not drawn to scale, and is substantially larger than illustrated. The CIN-beam is directed onto approximately the same sample 103 spot to which the laser beam 104 is directed. The sample is typically deposited onto a carrier or chip 201. The neutrals and the ions of the sample 204 (as well as fragments thereof and matrix molecules and clusters of the various species) which are desorbed by the pulsed laser beam 104 expand into, or are ejected into, the approximately hemisphere 205 above the chip 201. Realistically, the expansion is non-isotropic and depends on the angle with which the laser is impinging, hence the illustrative approximation as a hemisphere only serves as simplified explanation. The irradiated sample region is exposed to an electric field generated by a typically variable voltage source 206, thereby providing potential U to the at least partially conductive carrier or chip 201 and typically axisymmetric electrodes 208 of appropriate shape enabling the extraction of sample ions 105. If the carrier or chip 201 are non conductive, an additional electrode behind the chip may be used to create the electric field. In most embodiments a plurality of electrodes and variable voltage sources will be used to create the required electric fields. These voltage sources may commonly reference to ground or be entirely or partially be stacked and floating on another potential, for example the potential present at the elements of a mass spectrometer into which the sample ions are injected.

An advantage of using a dedicated ion beam gun, per certain embodiments of the present invention, is that it enables (1) the generation and control high space charge densities, (2) spatial and temporal control and guidance of charges/ions with electric and/or magnetic fields, and (3) synchronization of the charge injection with the laser operation. Typical achievable CIN-ion beam currents vary over several orders of magnitude (for example, $I=10^{-6}$ to $10^{-2}$ A, although both higher or lower currents may also be used) and depend on the actual gun design, the operating conditions and the ion type. High beam currents are generally desirable. For example in some embodiments, assuming an ejection velocity of $v_e=5\cdot10^2$ m/s and in a 1st order, assuming isotropic velocity distribution, and further requiring that the ejected neutrals shall not have traveled more than $r_e=2.5\cdot10^{-3}$ m away from the sample surface (approximating the dimension of a CIN-beam diameter of $d=5\cdot10^3$ m) a time of $t_i=(2.5\cdot 10^{-3}\text{ m})/(5\cdot10^2\text{ m/s})=5\cdot10^{-6}$ s is interaction time between the neutrals and the CIN-ions is available. The number of charges injected by a current of $I=2\cdot10^{-3}$ A in the hemispherical volume 205 defined by radius $r_e$ is approximately:

$$n \approx 1/e \cdot t_i \cdot I$$

$$\approx (1.6\cdot10^{-19} As)^{-1} \cdot 5\cdot10^{-6} s \cdot 2\cdot10^{-3} A$$

$$n \approx 6\cdot10^{10}$$

Assuming that 1 fmol ($=6\cdot10^{23-15}=6\cdot10^8$) of analyte molecules were deposited in the sample and desorbed by the laser pulse predominately as neutrals, the number of available charges exceeds the number of neutrals by two orders of magnitude.

Duo-plasmatron, RF, Micro-Wave, or Penning type ion guns suitable for the CIN-beam injection are commercially available (e.g. 'Oxford Scientific', SPECS, National Electrostatics Corp.) and may be easily modified to satisfy the requirements of this particular application. In certain embodiments, the optimal (kinetic) ion energy is relatively low, typically on the order of some $E_k=10^0$ to some $10^2$ eV. Since the kinetic energies of many ion guns are higher, in some embodiments ion beam deceleration may be required by means of additional retarding potentials. An example of such modification, if required, is described in Popova, et al.: "Construction and performance of a low energy ion gun", J. Vac. Sci. Technol. A21(2) March/April 2003, pp 401-403.

Figure 3:
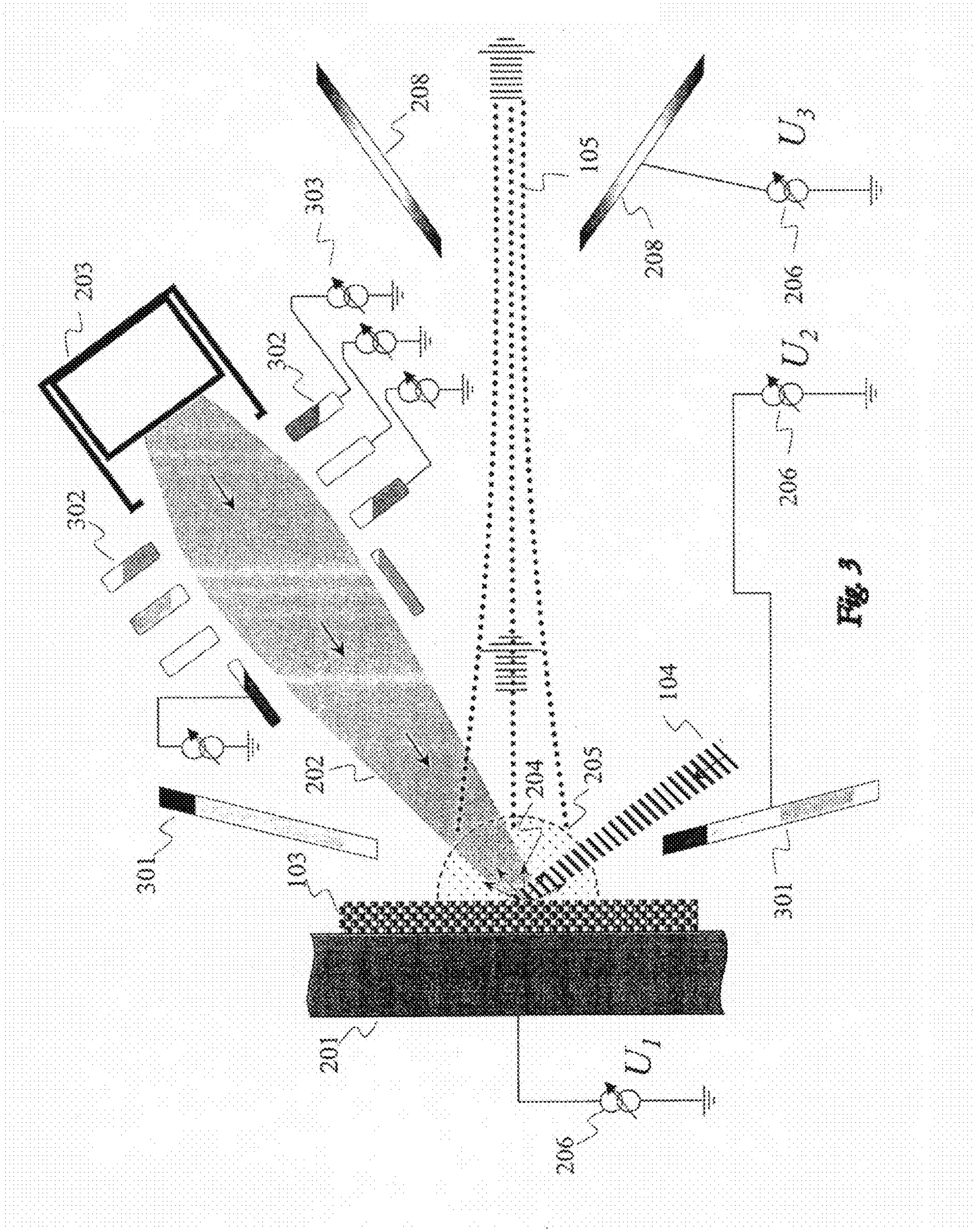
FIG. 3 depicts an example of another embodiment of an inventive embodiment of a CIN-LDI/CIN-MALDI ion source with additional apparatus provided to facilitate additional control of the CIN-beam. A plurality of additional electrodes and variable voltage sources variously retard, accelerate, focus, modulate, or deflect the CIN-beam. In additional embodiments, magnetic fields may also be used, including in conjunction with the ion beam gun, and in some instances in conjuction with or without electric fields to deflect, focus or otherwise manipulate the ion beam.

In FIG. 3, an example of a more complex configuration of an inventive embodiment of the CIN-LDI/CIN-MALDI ion source is shown that enables additional control of the CIN-beam. The example shows two electrodes 208 and 301 for sample ion extraction. It also shows a plurality of electrodes 302 connected to additional variable voltage sources 303 which can be used to retard or accelerate, focus, modulate, or deflect the CIN-beam. The electrodes can made such as to form electric lenses to focus or defocus the beam, accelerate or decelerate the beam or to deflect the beam. There may also be additional elements that effect magnetic forces on the CIN-beam such as magnetic deflection systems.

Figure 4:
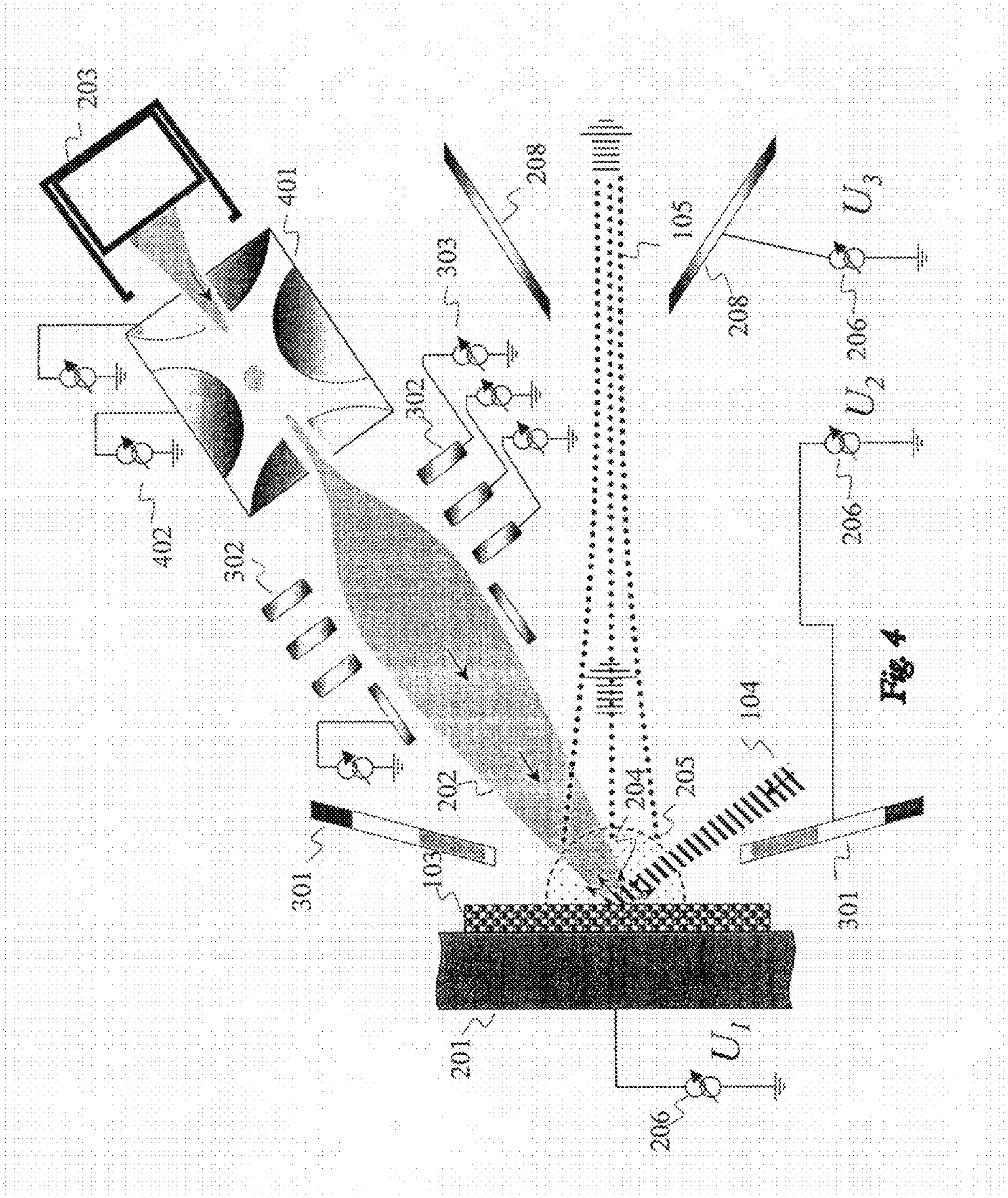
FIG. 4 depicts an inventive embodiment of a CIN-LDI/CIN-MALDI ion source wherein a CIN-beam is guided not directly onto the sample but into an 3D RF ion trap to accumulate charge. The accumulated CIN-ions can then be released in a single bunch or series of bunches from the trap and accelerated into the LDI/MALDI region. The release may be synchronized with the laser pulses.

In FIG. 4 an embodiment of the present invention is depicted wherein a CIN-beam is guided not directly onto the sample, but rather into an ion trap 401 to accumulate charge. The ion trap 401 may be connected to a plurality of variable DC and AC voltage supplies 402. The CIN-ions are then released in bunches from the trap and accelerated into the LDI/MALDI region synchronized with laser pulses by means of the before mentioned electrodes 302. Such synchronization might entail having the CIN-beam released before, during or after or any combination of the foregoing. Again, in this depiction all potentials on electrodes are referenced to ground which will not be the case in all applications. The potentials voltage supplies may be stacked and/or commonly floating on a supplied potential. The CIN-beam may be continuous, pulsed, or arbitrarily time-dependent modulated, preferably in a manner which is synchronized to the LDI laser(s) pulse(s).

As used herein, the word "beam" should be understood to mean charged particles traveling in generally a certain trajectory that may be continuous, pulsed, or arbitrarily modulated in intensity and/or energy. This applies particularly to the use of "beam" in conjunction with the term "CIN-beam".

Figure 5:
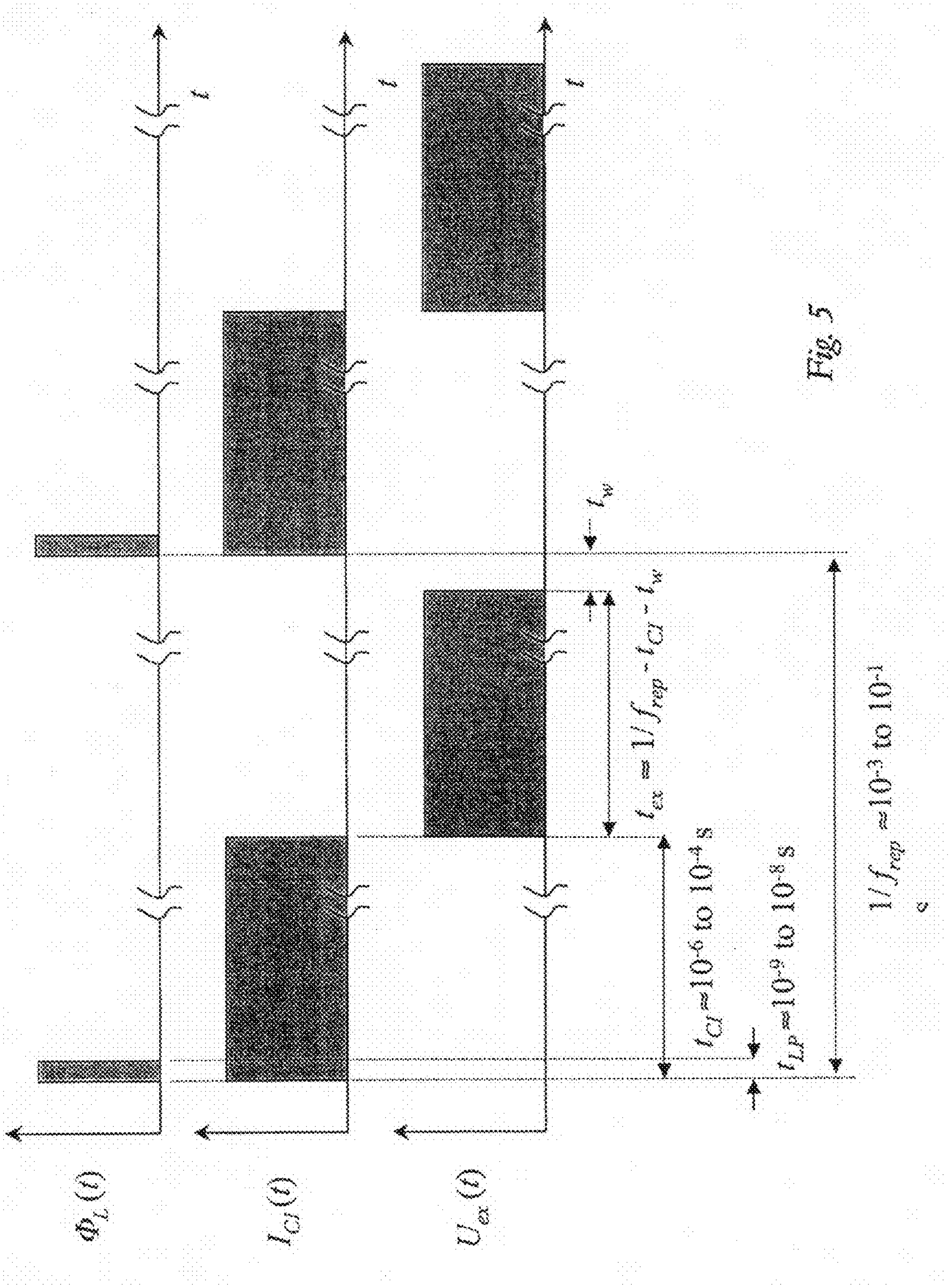
FIG. 5 depicts the timing and synchronization of laser radiant flux $\Phi_L(t)$, CIN-beam current $I_{CI}(t)$ and sample ion extraction potential $U_{ex}(t)$.

In another embodiment of the invention, as illustrated in FIG. 5, the CIN-beam current $I_{CI}(t)$ may be pulsed or modulated in a pulse-like or arbitrarily time-dependent manner, and synchronized with the laser radiant flux $\Phi_L(t)$. As mentioned, typical duration times for the laser flux may be on the order of $t_{LP} \approx 10^{-9}$ to $10^{-8}$ second. The charge injection ($t_{CI}$) depends on the chosen velocity of the CIN-ions and a characteristic dimension of the plume region; typical values are on the order of $t_{CI} \approx 10^{-6}$ to $10^{-4}$second.

In addition, in the embodiment of FIG. 5, the potentials on the sample and the sample ion extraction electrodes 301 and 208 in the CIN-LDI/CIN-MALDI ion source are synchronized. During the CIN-beam injection the potentials on the sample and the electrodes, here referred to as $U_{ex}(t)$, are turned off, or floated, or changed such that the CIN-ion trajectories are preferable or at least not disturbed by the electric field normally created by the sample ion extraction electrodes during extraction. After the CIN-ion injection pulse is completed, the potentials $U_{ex}(t)$ return to values optimal for the sample ion extraction. The duration $t_{ex}$ of the extraction is primarily dominated by the laser repetition rate $f_{rep}$, typically on the order of $f_{rep} \approx 10^1$ to $10^3$ Hz, and to a lesser extent on an optional wait time $t_w$. The sequence repeats according to the laser firing repetition. This embodiment illustrates a mode of operation in which the CIN-beam is injected after the laser is fired. As pointed out earlier, numerous other variations in synchronization of the CIN-beam injection and laser firing are possible.

Figure 6:
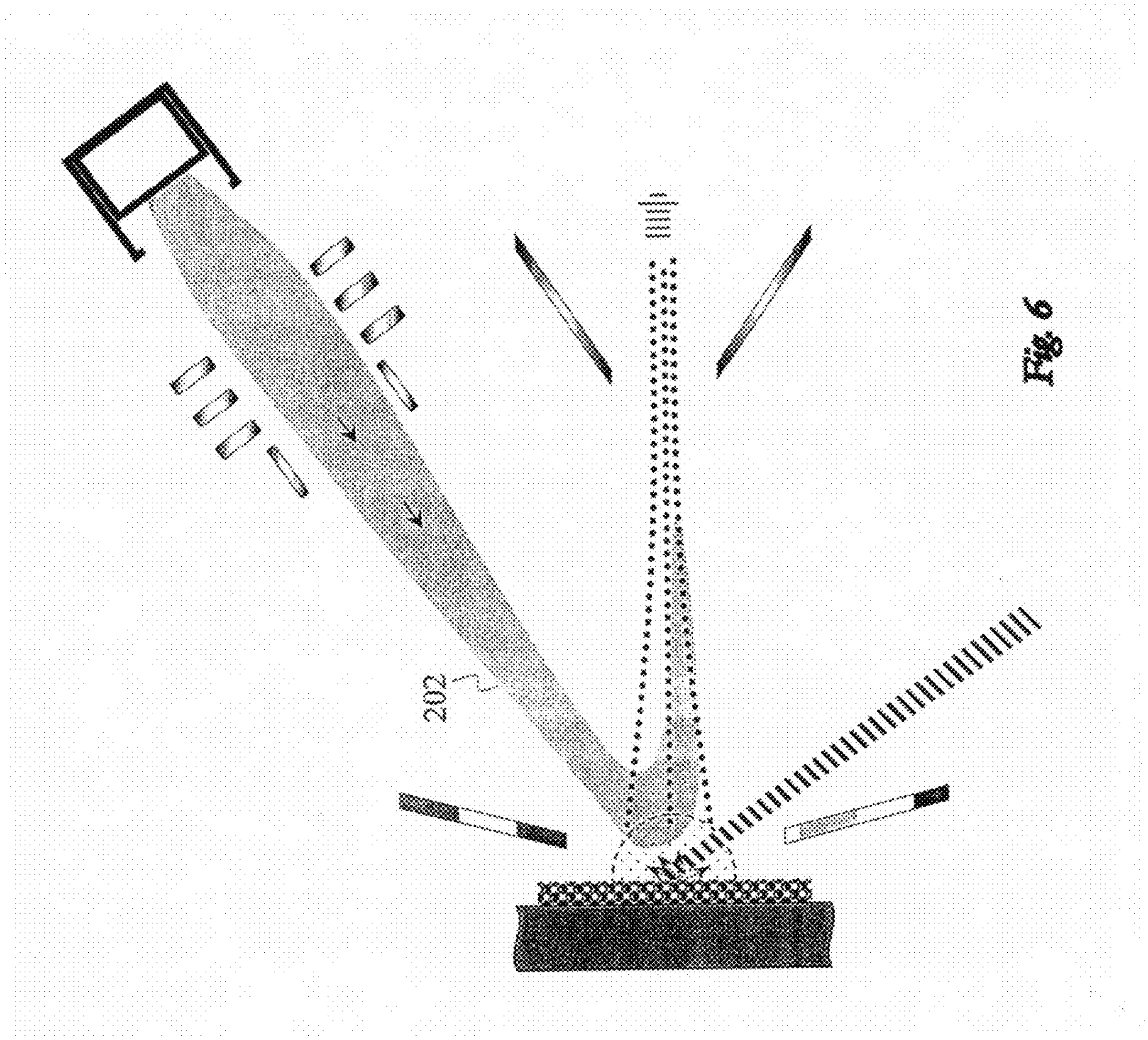
FIG. 6 depicts an inventive embodiment wherein, given the specific conditions of the embodiment, the kinetic energy of the CIN-ions is such that a proportion, sometimes a large proportion of the CIN-beam has insufficient kinetic energy to reach the sample target, thus causing the CIN-beam to change or generally reverse direction so that a portion of the CIN-beam is redirected to cover a larger area in which an interaction with sample neutrals may occur.

In one basic operating mode of certain embodiments of the invention, the kinetic energy of the CIN-ions is sufficient to reach the sample target. As a result the CIN-ion-sample interaction may predominately occur on the sample surface or its immediate proximity where the plume of neutrals/ions expands. In a second basic operating mode, depicted in FIG. 6, the kinetic energy of the CIN-ions insufficient, given the specific operational parameters of the device, to reach the sample target causing the CIN-beam 202 to change or generally reverse direction; this may increase the collision probability with neutrals thereby having most of the ionization of the neutral sample molecules occurring in a larger region than immediately adjacent to the sample. However, the total achievable space charge density is smaller in this embodiment.

Figure 7:
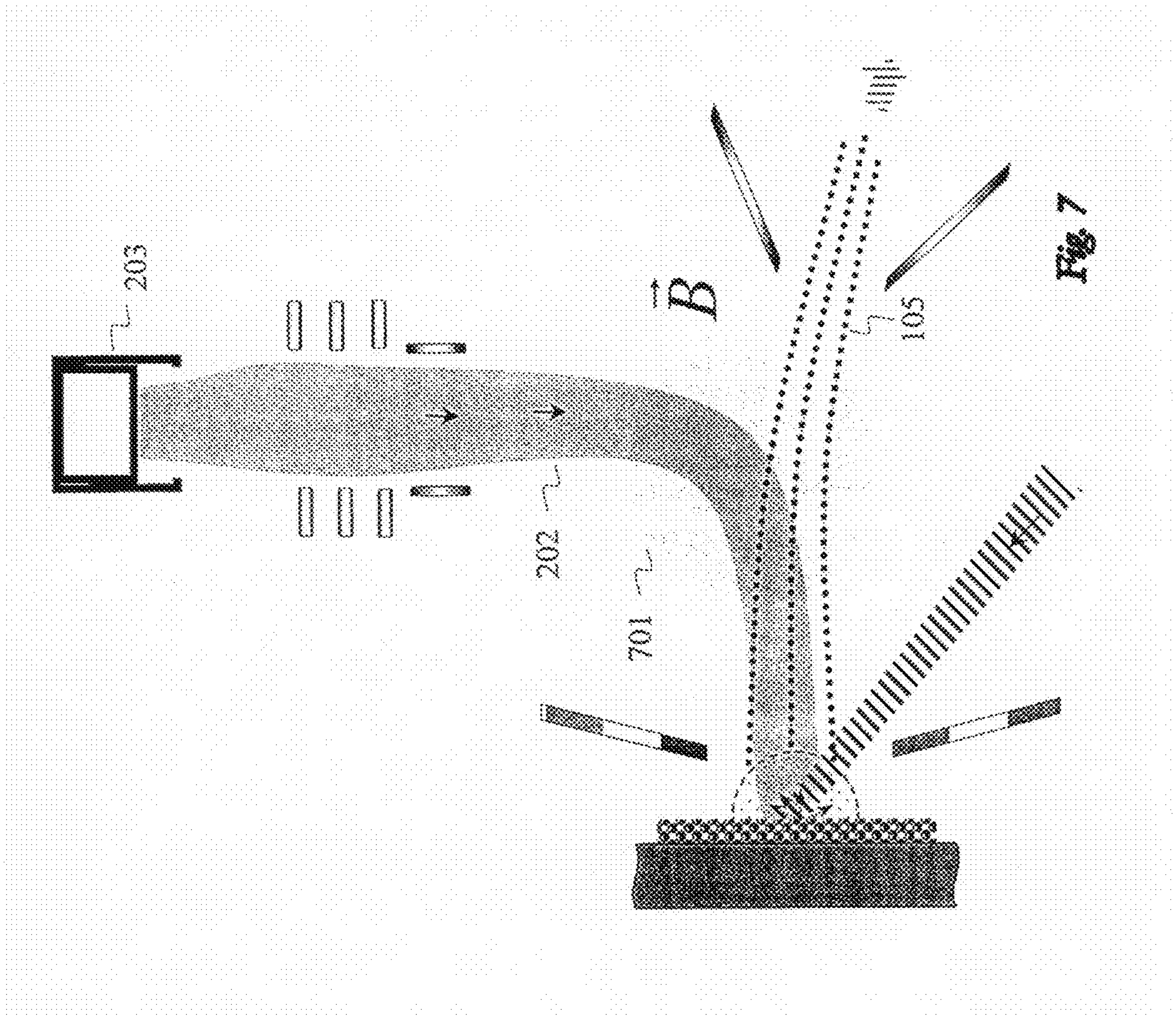
FIG. 7 depicts an inventive embodiment similar to that of FIG. 6 with an additional magnetic field configured orthogonally with respect to the plane of the drawing.

Another embodiment of the invention is shown in FIG. 7, wherein an additional magnetic field, orthogonal to the plane of the drawing, is generated in region 701. (The depiction is rendered in an oversimplified manner, as a magnetic field has no sharp boundaries). This embodiment allows facilitated sample access for the CIN-beam and, in some cases, more desirable arrangements of the ion beam gun 203 since the CIN-beam 202 is deflected by the magnetic field. The magnetic field also influences the trajectories of the extracted sample ions, however to a significantly lesser degree than it influences the CIN-beam ions. This configuration utilizes the effect that Lorenz forces in magnetic field depend linearly on the velocity of a charged particle. Since the mass if the CIN-ions is typically orders of magnitude lower than typical sample ion masses, their velocity and hence the Lorenz force acting on them is significantly larger for a given kinetic energy. As a result, the bending radius is smaller.

Figure 8:
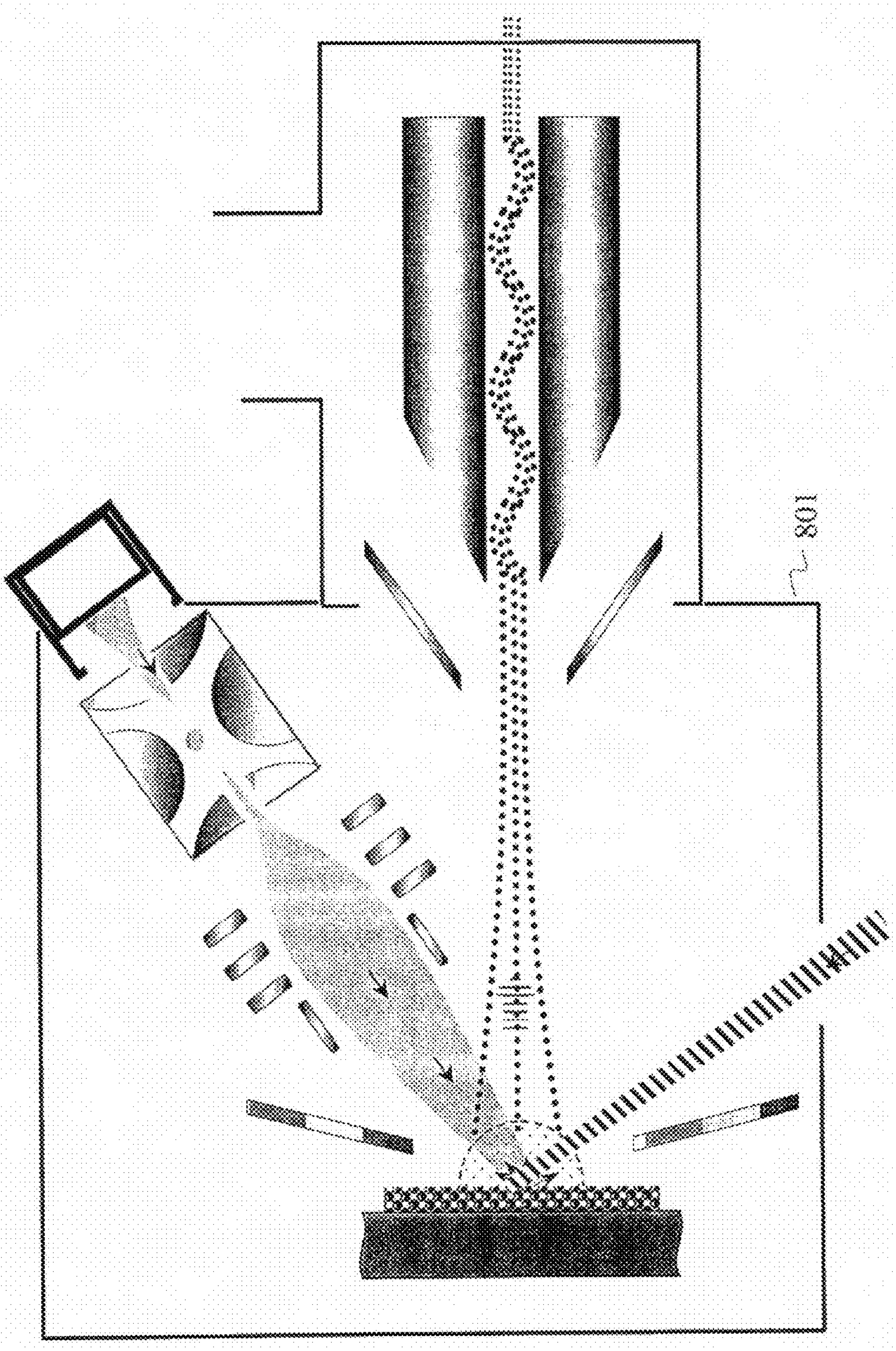
FIG. 8 depicts an embodiment of an inventive CIN-LDI/CIN-MALDI ion source (configuration similar to that depicted in FIG. 4) connected to an RF quadrupole.

FIG. 8 shows an embodiment of an inventive CIN-LDI/CIN-MALDI ion source, such as the configuration depicted in FIG. 4, which is connected to further ion-optical elements, in this particular case to a RF quadrupole or RF multipole, which can be operated as ion guide or as mass/charge filter. The CIN-LDI/CIN-MALDI ion source, here shown as a separate unit 801 from the RF quadrupole, may be also connected to any other type of ion guide or trap.

Figure 9:
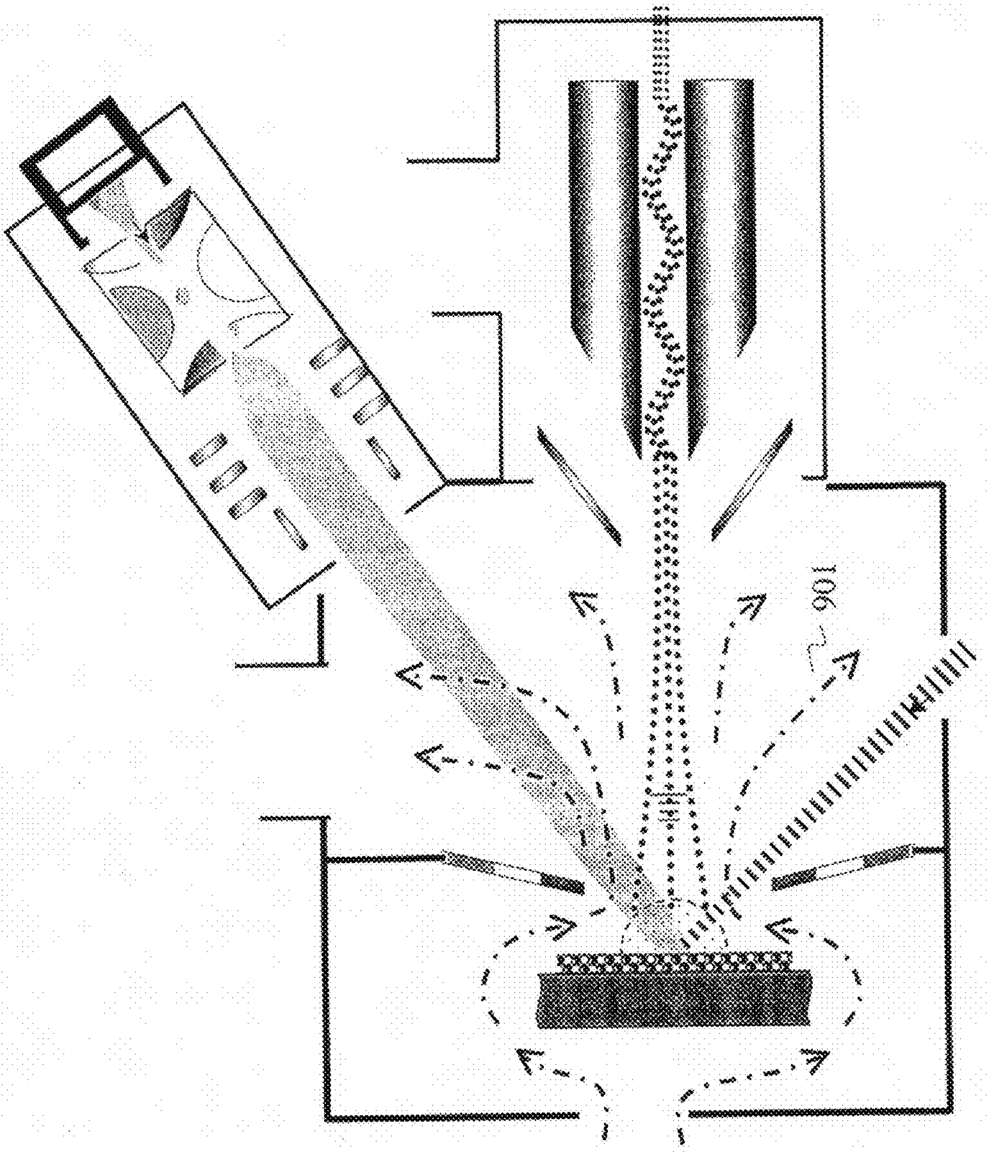
FIG. 9 depicts an inventive embodiment similar to the configuration as in FIG. 8 with the addition of preferably axisymmetric gas flow for collisional cooling of sample ions.
Figure 10:
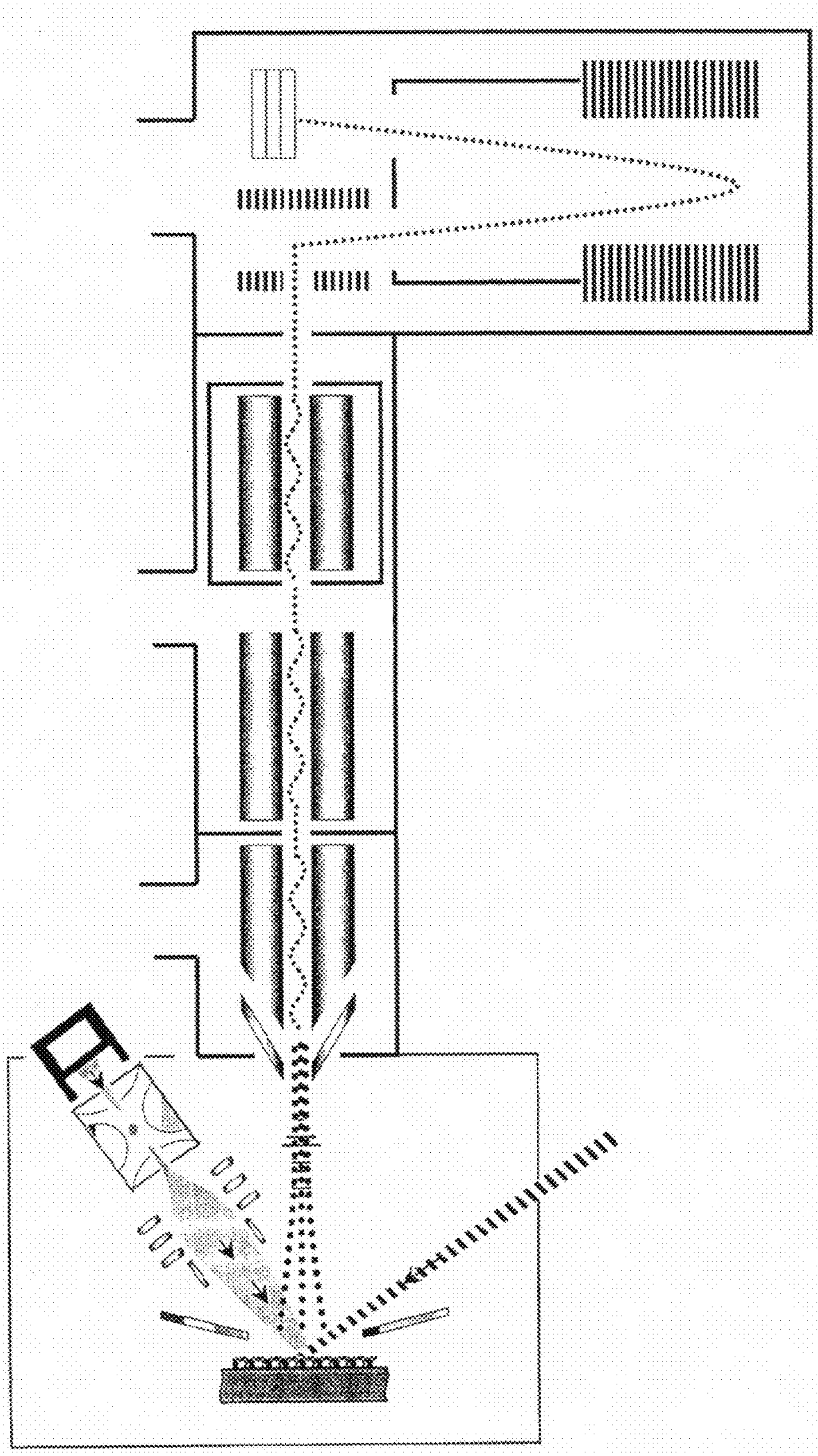
FIG. 10 depicts an inventive embodiment of a CIN-LDI/CIN-MALDI ion source connected to a high-end triple-quadrupole-Time-of-Flight (TOF) instrument.

FIG. 9 shows a similar configuration of the invention as seen in FIG. 8 with the addition of preferably axisymmetric gas flow 901 for collisional cooling of sample ions. FIG. 10 depicts an embodiment of the inventive CIN-LDI/CIN-MALDI ion source connected to a high-end triple-quadrupole-Time-of-Flight (TOF) instrument.

In some embodiments the CIN-beam may include several different species of low molecular weight ions, including protons. The energy of the CIN-beam may also be modulated or scanned. The direction of the CIN-beam may also be scanned in one or more directions. The CIN-beam may also be adjusted according to the conditions generated by variations in the cooling gas flow (such as gas speed and flow rate) in the electro-pneumatic superposition embodiments. Further, all the operational variables of the embodiments of the CIN-beam source may be controlled by using an active feedback and control system which analyses data from the attached ion analytical instrument to optimize its performance in various metrics, including metrics such as total ion yield, relative ion yield of a certain molecular species, or relative ion yield in a certan mass range. The control may also include synchronizing any parameters of the CIN-LDI/CIN-MALDI ion source with any operational parameter of an attached ion analytical device.

In other embodiments of the present invention, other methods and/or devices in addition or alone (besides laser pulses) can be used to generate, desorb, liquify, vaporize or otherwise release sample molecules, including neutral sample molecules into a region wherein the interaction with the CIN-beam is facilitated. In some of these embodiments, the source of the sample molecules is not either of an LDI/MALDI ion source.

While particular embodiments of the invention and variations thereof have been described in detail, other modifications and methods of using the disclosed workflow management system will be apparent to those of skill in the art. Accordingly, it should be understood that various applications, modifications, and substitutions may be made of equivalents without departing from the spirit of the invention or the scope of the claims. Various terms have been used in the description to convey an understanding of the invention; it will be understood that the meaning of these various terms extends to common linguistic or grammatical variations or forms thereof. It will also be understood that when terminology referring, for example to physical equipment, hardware, or software has used trade names or common names, that these names are provided as contemporary examples, and the invention is not limited by such literal scope. Terminology that is introduced at a later date that may be reasonably understood as a derivative of a contemporary term or designating of a subset of objects embraced by a contemporary term will be understood as having been described by the now contemporary terminology. Further, it should be understood that the invention is not limited to the embodiments that have been set forth for purposes of exemplification, but is to be defined only by a fair reading of claims that will be appended, including the full range of equivalency to which each element thereof is entitled.

What is claimed is:

1. A method of enhancing ion generation efficiency in an ion source by injecting an independent beam of relatively low molecular weight ions into a population of relatively larger molecular weight neutral sample molecules, wherein generated ionized sample molecules are extracted generally along a first axis from a region of interaction with the low molecular ions;

the independent beam is guided into the population generally along a second axis that is at an angle with the first axis.

2. The method of claim 1 wherein a first set of at least partially electrically conductive elements positioned along the first axis at least partially facilitate the extraction of the generated ionized sample molecules generally along the first axis.

3. The method of claim 2 wherein a second set of at least partially electrically conductive elements positioned along the second axis at least partially facilitate the guiding of the ions of the independent beam generally along the second axis.

4. The method of claim 1, wherein a gas flow is directed to the population of relatively larger molecular weight sample molecules in a generally axisymmetric fashion with respect to the first axis.

5. The method of claim 4, wherein the gas flow accomplishes cooling of at least some of the larger molecular weight sample molecules.

6. The method of claim 4, wherein the gas flow is initially directed generally axisymmetrically radially inwardly onto the first axis and then expands radially outwardly from the first axis as it moves generally along the first axis.

7. The method of claim 1, wherein a laser pulse is used to desorb sample molecules.

8. The method of claim 7, wherein the laser is pulsed to desorb sample molecules, then the beam of relatively low molecular weight ions is injected into the population of desorbed sample molecules, and electrical potential applied to a first set of electric elements at least partially facilitates extraction of sample molecules.

9. The method of claim 8, wherein the electrical potential applied to the first set of electric elements is changed after injection of low molecular weight ions to change the electrical fields reaching the sample molecules to preferentially affect sample molecule extraction.

10. The method of claim 7 wherein the laser is pulsed to desorb sample molecules a plurality of times while the beam of relatively low molecular weight ions is injected into the population of desorbed sample molecules.

11. The method of claim 7 wherein the injection of relatively low molecular weight ions begins prior to the laser pulse to desorb sample molecules.

12. The method of claim 7 wherein a change is made to the electrical potential applied to a first set of electric elements after the injection of the relatively low molecular weight ion beam to at least partially affect the extraction of sample molecules along the first axis.

13. The method of claim 7 wherein a change is made to the electrical potential applied to a first set of electric elements during the injection of the relatively low molecular weight ion beam to at least partially affect the extraction of sample molecules along the first axis.

14. The method of claim 3, wherein a first set of electric potentials is applied to at least some of the first and second at least partially electrically conductive elements to primarily facilitate injection of the low molecular weight ions and a second of electric potentials is applied to at least some of the first and second at least partially electrically conductive elements to facilitate extraction of sample ions.

15. The method of claim 1, wherein the energy of the injected beam is time dependently modulated during injection into the region of interaction.

16. The method of claim 1, wherein the intensity of the injected beam is time dependently modulated during injection into the region of interaction.

17. The method of claim 1, wherein ions are accumulated in an ion trap prior to injection into the region of interaction.

18. The method of claim 1, wherein the relatively low molecular weight ion beam is scanned across at least a portion of the population of sample molecules.

19. The method of claim 1, wherein the relatively low molecular weight ion beam is scanned across at least a portion of a carrier of sample molecules.

20. The method of claim 19, wherein a laser beam is scanned across the carrier in 1, wherein the relatively low molecular weight ion beam is scanned across the carrier simultaneously with the ion beam.

* * * * *